(12) United States Patent
Rudy

(10) Patent No.: US 9,078,420 B1
(45) Date of Patent: Jul. 14, 2015

(54) STAMP/WEB-MOUNTING FISHING TACKLE

(76) Inventor: Christopher John Rudy, Fort Gratiot Township, MI (US)

( * ) Notice: Subject to any disclaimer, the term of this patent is extended or adjusted under 35 U.S.C. 154(b) by 1826 days.

(21) Appl. No.: 08/683,105

(22) Filed: Jul. 16, 1996

Related U.S. Application Data

(63) Continuation-in-part of application No. 08/486,900, filed on Jun. 7, 1995, now abandoned, which is a continuation-in-part of application No. 29/004,834, filed on Jan. 13, 1993, now abandoned.

(60) Provisional application No. 60/001,460, filed on Jul. 17, 1995.

(51) Int. Cl.
*A01K 85/00* (2006.01)

(52) U.S. Cl.
CPC ...................... *A01K 85/00* (2013.01)

(58) Field of Classification Search
USPC .................. 43/42.32, 44.87, 42.33, 42.34
See application file for complete search history.

(56) References Cited

U.S. PATENT DOCUMENTS

| | | | |
|---|---|---|---|
| 161,225 A | 3/1875 | Hall | 206/39 |
| 164,833 A | 6/1875 | Hall | 206/39 |
| 458,126 A | 8/1891 | Goldbeck | 206/39 |
| 475,400 A | 5/1892 | Houghton | 40/660 |
| 1,211,681 A | 1/1917 | Currie | 40/660 |
| 1,385,627 A * | 7/1921 | Lane | 43/42.32 |
| 1,600,653 A | 9/1926 | Steenstrup | 43/42.09 |
| 1,740,335 A | 12/1929 | Hamilton | 43/42.33 |
| 1,776,090 A | 9/1930 | Shroyer | 43/42.09 |
| 1,968,209 A | 7/1934 | Irby | 40/607.13 |
| 2,012,420 A | 8/1935 | Day | 40/1.5 |
| 2,145,296 A | 1/1939 | Draper et al. | 40/1.5 |
| 2,156,553 A | 5/1939 | Vendope | 40/660 |
| 2,213,449 A | 9/1940 | Mungen | 40/1.5 |
| 2,232,060 A | 2/1941 | Foster | 40/1.5 |
| 2,297,285 A | 9/1942 | Bledsoe | 40/661 |
| 2,309,521 A | 1/1943 | Mabee | 43/42.33 |
| 2,360,815 A | 10/1944 | Mungen | 40/1.5 |
| 2,529,642 A | 11/1950 | Vaugh et al. | 43/42.32 |
| 2,540,221 A | 2/1951 | Hoevmarinus et al. | 40/661 |
| 2,540,718 A | 2/1951 | Duskin | 40/651 |
| 2,548,706 A | 4/1951 | Corning | 40/661 |
| 2,573,592 A | 10/1951 | Sage | 43/42.33 |
| 2,594,673 A | 4/1952 | Nichols | 43/42.33 |
| 2,599,035 A | 6/1952 | Wing | 43/42.33 |
| 2,665,511 A | 1/1954 | Bradberry | 43/42.33 |
| 2,670,559 A | 3/1954 | Webb et al. | 43/42.33 |
| 2,670,560 A * | 3/1954 | Matras | 43/44.87 |
| 2,677,901 A | 5/1954 | Tilleman | 40/660 |

(Continued)

FOREIGN PATENT DOCUMENTS

| | | | | |
|---|---|---|---|---|
| JP | 404084840 | * | 3/1992 | 42/32 |
| JP | 2000218999 A | | 8/2000 | |

(Continued)

OTHER PUBLICATIONS

Apr. 22, 2011, Office action in U.S. Appl. No. 10/360,681.

(Continued)

*Primary Examiner* — Christopher P Ellis

(57) ABSTRACT

Fishing tackle contains a stamp such as a postage stamp or a trading stamp, or a photograph or a picture. Lures, spoons, spinners, bobbers, nets may be included accordingly, for example, as a stamp-mounting fishing lure.

21 Claims, 6 Drawing Sheets

(56) References Cited

U.S. PATENT DOCUMENTS

| | | | |
|---|---|---|---|
| 2,733,535 A | 2/1956 | Rosen | 43/42.33 |
| 2,740,220 A | 4/1956 | Caplan | 43/42.34 |
| 2,754,610 A | 7/1956 | Fitts | 43/17.6 |
| 2,796,693 A * | 6/1957 | Gunterman | 43/42.32 |
| 2,834,141 A * | 5/1958 | Quyle | 43/42.32 |
| 2,951,308 A | 9/1960 | Kent | 43/42.33 |
| 2,996,826 A | 8/1961 | Lamar | 43/42.32 |
| 3,040,462 A | 6/1962 | Guida | 43/17.6 |
| 3,069,801 A | 12/1962 | Mills | 43/42.33 |
| 3,210,882 A | 10/1965 | Purdom | 43/42.33 |
| 3,281,978 A | 11/1966 | Drugan | 40/308 |
| 3,360,882 A | 1/1968 | Belokin, Jr. | 43/42.33 |
| 3,392,474 A * | 7/1968 | DeWeese | 43/42.32 |
| 3,407,523 A | 10/1968 | Winston | 40/1.5 |
| 3,408,764 A | 11/1968 | McCurry | 43/42.33 |
| 3,423,868 A | 1/1969 | Master | 43/42.33 |
| 3,505,754 A | 4/1970 | Lawlor | 43/42.33 |
| 3,528,189 A | 9/1970 | Lilley | 43/42.33 |
| 3,540,144 A | 11/1970 | Gurka | 43/42.33 |
| 3,631,625 A | 1/1972 | Castner | 43/42.33 |
| 3,708,903 A | 1/1973 | Bercz et al. | |
| 3,762,092 A | 10/1973 | Bercz et al. | 43/42.09 |
| 3,834,058 A * | 9/1974 | Gaunt | 43/42.32 |
| 3,902,266 A | 9/1975 | Howard | 43/42.32 |
| 3,940,869 A | 3/1976 | Roberts | 43/42.34 |
| 3,947,989 A | 4/1976 | Bart | 43/42.33 |
| 3,969,836 A | 7/1976 | DuBois | 40/665 |
| 4,177,587 A | 12/1979 | Dorsen et al. | 40/649 |
| 4,208,823 A | 6/1980 | Hershberger | 43/42.09 |
| 4,249,330 A | 2/1981 | Chioffe | 63/18 |
| 4,408,406 A | 10/1983 | Barton | 40/660 |
| 4,429,482 A | 2/1984 | Honse | 43/42.32 |
| 4,464,857 A | 8/1984 | Olszewski | 43/42.33 |
| 4,594,802 A | 6/1986 | Field | 40/661 |
| 4,637,160 A | 1/1987 | Biskup | 43/42.33 |
| 4,638,584 A | 1/1987 | Lindsay | 43/42.33 |
| 4,700,504 A | 10/1987 | Mattison | 43/42.33 |
| 4,704,770 A | 11/1987 | Minami et al. | 40/661 |
| 4,726,469 A | 2/1988 | Farber | 206/776 |
| 4,741,120 A | 5/1988 | Cota et al. | 43/42.33 |
| 4,803,793 A | 2/1989 | Schellenberg, III | 43/42.33 |
| 4,823,497 A | 4/1989 | Pierce | 43/17.6 |
| 4,831,765 A * | 5/1989 | Bradshaw | 43/42.32 |
| 4,866,952 A | 9/1989 | Hight et al. | 63/18 |
| 4,881,340 A * | 11/1989 | Davis | 43/42.32 |
| 4,889,748 A | 12/1989 | Dudley | 40/661 |
| 5,036,617 A | 8/1991 | Waldrip | 43/42.33 |
| 5,044,110 A * | 9/1991 | Henderson | 43/42.33 |
| 5,077,930 A * | 1/1992 | Berry | 43/42.32 |
| 5,131,182 A * | 7/1992 | Ising | 43/42.33 |
| 5,299,107 A | 3/1994 | Ratcliffe et al. | 43/17.6 |
| 5,355,613 A | 10/1994 | Kechriotis | 43/42.33 |
| 5,487,203 A | 1/1996 | Brach et al. | 40/661 |
| 5,638,631 A | 6/1997 | Guerri et al. | 43/42.33 |
| 5,678,349 A | 10/1997 | Pacora | 43/42.33 |
| 5,810,372 A | 9/1998 | Arendt | 40/308 |
| 5,890,308 A | 4/1999 | Harrington | 40/661 |
| 5,933,994 A | 8/1999 | Misaresh | 40/661 |
| 6,009,653 A | 1/2000 | Harrington | 40/661 |
| 6,010,000 A | 1/2000 | Tran | 206/776 |
| 6,029,388 A | 2/2000 | Yokogawa et al. | 43/17.6 |
| 6,058,645 A | 5/2000 | Lummis | 43/42.33 |
| 6,092,658 A | 7/2000 | Pietrafesa | 206/776 |
| 6,202,337 B1 | 3/2001 | Yoshida | 43/42.33 |
| 6,212,809 B1 | 4/2001 | Gaule | 40/661 |
| 6,276,877 B1 | 8/2001 | Crawford | 40/661 |
| 6,345,458 B1 | 2/2002 | Garibian | 40/506 |
| 6,366,401 B1 | 4/2002 | Gonda et al. | 206/776 |
| 6,510,646 B1 | 1/2003 | Kechriotis | 43/42.33 |
| 6,718,675 B1 | 4/2004 | Lu | 40/661 |
| 6,986,220 B2 | 1/2006 | Kaulbach | 40/660 |
| 7,096,625 B1 | 8/2006 | Hering | 49/46 |
| 7,454,819 B2 | 11/2008 | Wu | 24/429 |
| 7,845,104 B1 | 12/2010 | Holzapfel | 40/660 |
| 2001/0054245 A1 | 12/2001 | Williams | 40/661 |
| 2006/0032109 A1 | 2/2006 | Chiodo | 43/42.09 |
| 2007/0199233 A1 | 8/2007 | Higgin | 43/42.32 |
| 2008/0104880 A1 | 5/2008 | Hegemier et al. | 43/42.32 |

FOREIGN PATENT DOCUMENTS

| | | |
|---|---|---|
| JP | 2003210074 A | 7/2003 |
| JP | 2003299425 A | 10/2003 |
| JP | 2003325080 A | 11/2003 |
| JP | 2004024226 A | 1/2004 |
| JP | 2007312765 A | 12/2007 |
| JP | 2008283876 A | 11/2008 |
| WO | WO 2005115137 A1 | 12/2005 |

OTHER PUBLICATIONS pp. 2-5 (CLAIMS AMENDMENTS) from Jul. 20th Amendment timely filed (mailed) in U.S. Appl. No. 10/360,681.

* cited by examiner

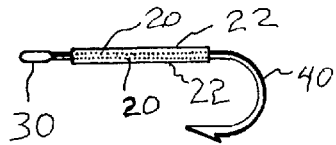 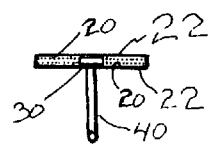 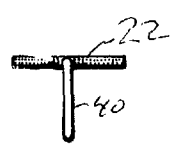 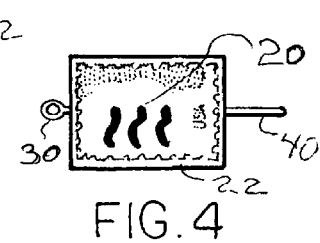
FIG. 1  FIG. 2  FIG. 3  FIG. 4
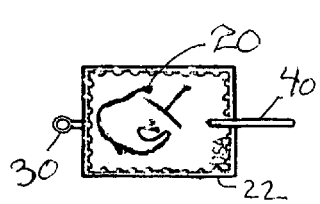 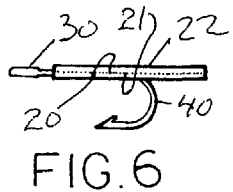 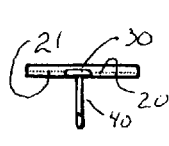 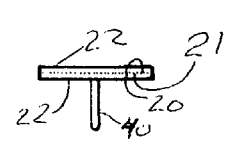
FIG. 5  FIG. 6  FIG. 7  FIG. 8
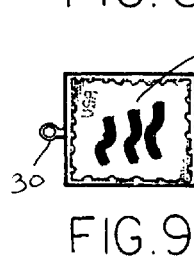 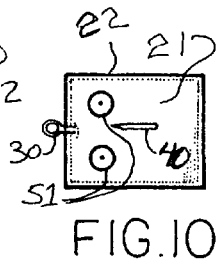 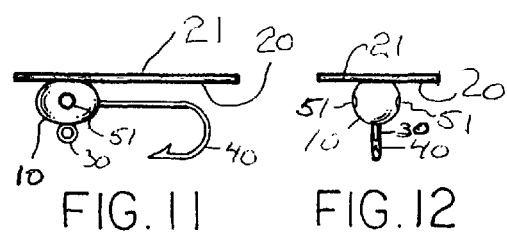 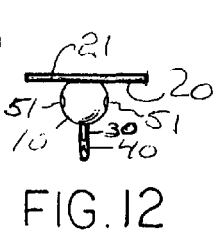
FIG. 9  FIG. 10  FIG. 11  FIG. 12
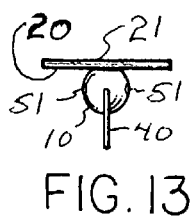 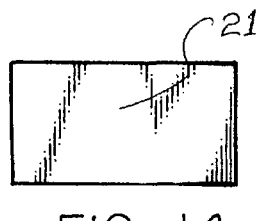 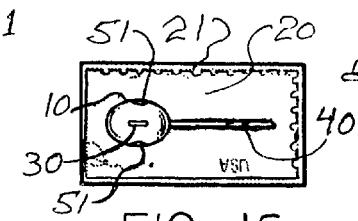 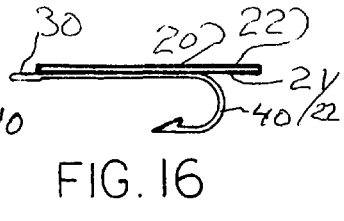
FIG. 13  FIG. 14  FIG. 15  FIG. 16
  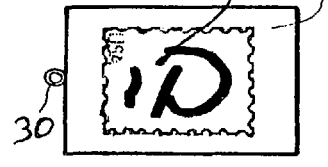 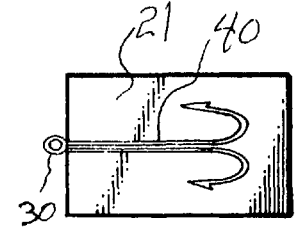
FIG. 17  FIG. 18  FIG. 19  FIG. 20

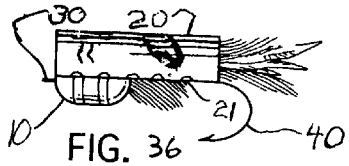
FIG. 36
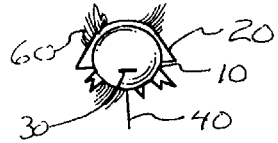
FIG. 37
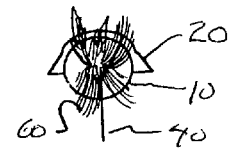
FIG. 38
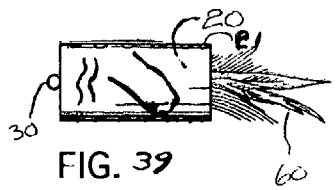
FIG. 39
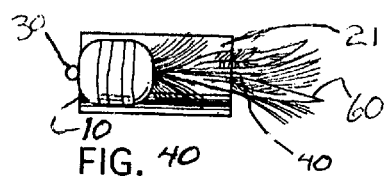
FIG. 40
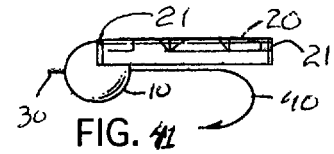
FIG. 41
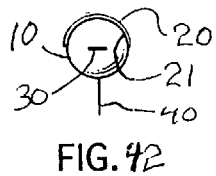
FIG. 42
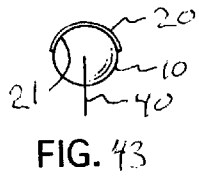
FIG. 43
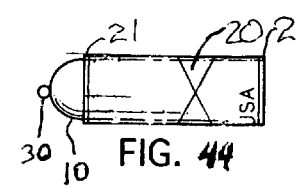
FIG. 44
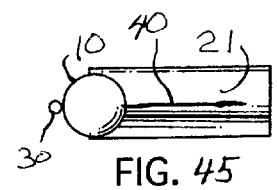
FIG. 45
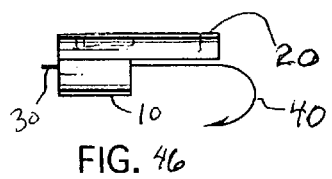
FIG. 46
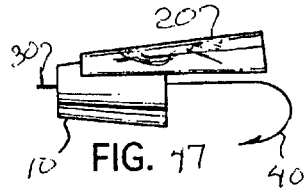
FIG. 47
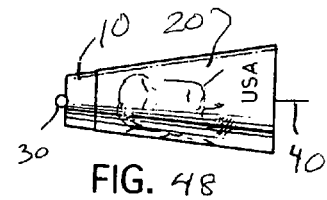
FIG. 48
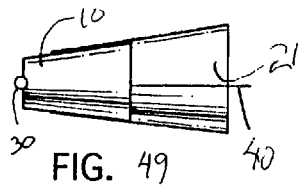
FIG. 49
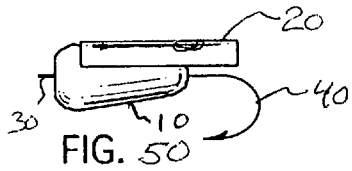
FIG. 50
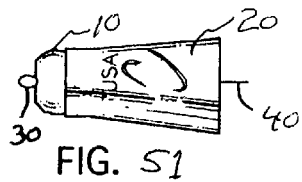
FIG. 51
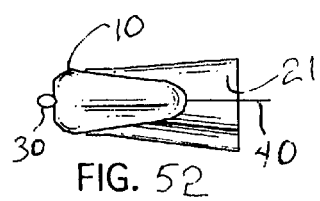
FIG. 52
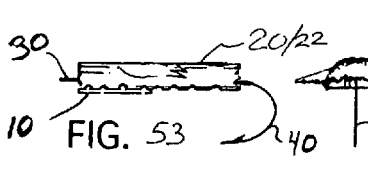
FIG. 53
FIG. 54
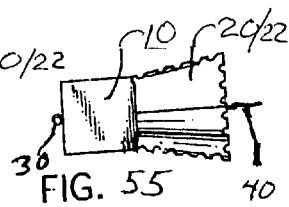
FIG. 55

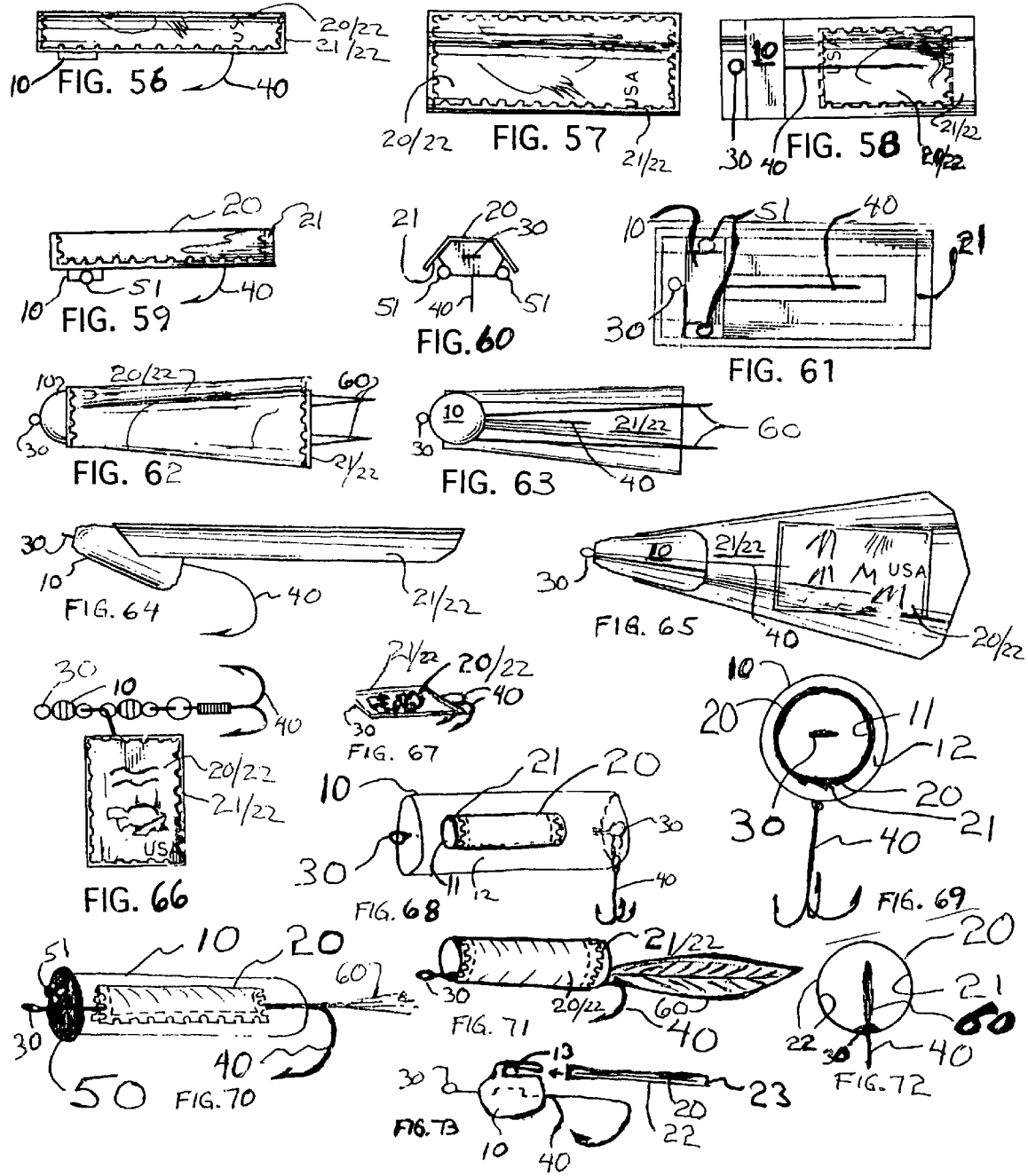

STAMP/WEB-MOUNTING FISHING TACKLE

CROSS-REFERENCES TO RELATED APPLICATIONS

This is a continuation-in-part of application Ser. No. 08/486,900 which was filed on Jun. 7, 1995 (abandoned) which is a continuation-in-part of application Ser. No. 29/004,834 which was accorded a filing date of Jan. 13, 1993(abandoned). This also claims the benefit of provisional application Ser. No. 60/001,460 which was filed on Jul. 17, 1995. Those applications are incorporated herein by reference.

BACKGROUND TO THE INVENTION

1. Field of the Invention

Most broadly and in general, the present invention concerns a stamp or web-mounting fishing item. More particularly and in particular or special embodiments, the invention concerns stamp-, photograph-, or picture-mounting fishing tackle, to include lures, spoons, spinners, bobbers, nets, and so forth.

2. Description of the Art

Rudy, U.S. Ser. Nos. 29/004,834 and 08/486,900, referenced above, discloses a stamp-mounting fishing lure, and stamp-mounting fishing tackle, respectively. This new class of lures and other tackle is characterized by a stamp, for an example, a postage stamp, being part thereof.

In his provisional application, Ser. No. 60/001,460, also referenced above, Rudy discloses a fishing lure and other tackle with web. Therein, certain particularized stamp-mounting fishing lures are provided, and the tackle can be provided with a photograph or picture.

Various other lure and tackle items are known. For example, the following art was cited in the aforesaid '900 application:

U.S. Pat. No. 5,077,930 to Berry.
U.S. Pat. No. 4,881,340 to Davis.
U.S. Pat. No. 3,834,058 to Gaunt.
U.S. Pat. No. 3,392,474 to De Weese.
U.S. Pat. No. 2,834,141 to Quyle.
U.S. Pat. No. 2,796,693 to Gunterman.
U.S. Pat. No. 2,670,560 to Matras.
U.S. Pat. No. 1,385,627 to Lane.
Japanese Patent Document No. 4-84840 (A) as 404084840.

Furthermore, the following art was additionally cited herein:

U.S. Pat. No. 5,131,182 to Ising.
U.S. Pat. No. 5,044,110 to Henderson et al.
U.S. Pat. No. 4,831,765 to Bradshaw.

SUMMARY OF THE INVENTION

Provided hereby is a stamp/web-mounting item of fishing tackle comprising fishing tackle in combination with a stamp such as a postage stamp or trading stamp, a photograph and/or a picture—further, in certain lures, with a web in a lure being curviplanar and graphic. Hook(s) may be attachable to the lure, spoon or spinner. Included thus are lures, spoons, spinners, bobbers, and nets.

The invention is a useful amusement or fishing article.

Significantly, the tackle presents a pleasing appearance and can be effective in fishing, in particular, in sport fishing methods. Thus, the lure, spoon and spinner can be effective in attracting and/or catching fish. It also can be a pleasing gift, conversation piece, or novelty item. Particular embodiments, to include plug and cylindrical body embodiments, are especially attractive if not especially effective.

Numerous further advantages attend the invention.

BRIEF DESCRIPTION OF THE DRAWINGS

The drawings form part of the present specification. In the drawings, in which like numerals refer to like features, the following is briefly noted:

FIG. 1 is a side view of a stamp-mounting fishing lure of the present invention.
FIG. 2 is a front view of the lure of FIG. 1.
FIG. 3 is a rear view of the lure of FIG. 1.
FIG. 4 is a top view of the lure of FIG. 1.
FIG. 5 is a bottom view of the lure of FIG. 1.
FIG. 6 is a side view of another stamp-mounting fishing lure of the invention.
FIG. 7 is a front view of the lure of FIG. 6.
FIG. 8 is a rear view of the lure of FIG. 6.
FIG. 9 is a top view of the lure of FIG. 6.
FIG. 10 is a bottom view of the lure of FIG. 6.
FIG. 11 is a side view of another stamp-mounting fishing lure of the invention.
FIG. 12 is a front view of the lure of FIG. 11.
FIG. 13 is a rear view of the lure of FIG. 11.
FIG. 14 is a top view of the lure of FIG. 11.
FIG. 15 is a bottom view of the lure of FIG. 11.
FIG. 16 is a side view of another stamp-mounting fishing lure of the invention.
FIG. 17 is a front view of the lure of FIG. 16.
FIG. 18 is a rear view of the lure of FIG. 16.
FIG. 19 is a top view of the lure of FIG. 16.
FIG. 20 is a bottom view of the lure of FIG. 16.
FIG. 36 is a side view of another stamp-mounting fishing lure of the invention.
FIG. 37 is a front view of the lure of FIG. 36.
FIG. 38 is a rear view of the lure of FIG. 36.
FIG. 39 is a top view of the lure of FIG. 36.
FIG. 40 is a bottom view of the lure of FIG. 36.
FIG. 41 is a side view of another stamp-mounting fishing lure of the invention.
FIG. 42 is a front view of the lure of FIG. 41.
FIG. 43 is a rear view of the lure of FIG. 41.
FIG. 44 is a top view of the lure of FIG. 41.
FIG. 45 is a bottom view of the lure of FIG. 41.
FIG. 46 is a side view of another stamp-mounting fishing lure of the invention.

FIG. 47 is a side view of another stamp-mounting fishing lure of the invention.

FIG. 48 is a top view of the lure of FIG. 47.

FIG. 49 is a bottom view of the lure of FIG. 47.

FIG. 50 is a side view of another stamp-mounting fishing lure of the invention.

FIG. 51 is a top view of the lure of FIG. 50.

FIG. 52 is a bottom view of the lure of FIG. 50.

FIG. 53 is a side view of another stamp-mounting fishing lure of the invention.

FIG. 54 is a rear view of the lure of FIG. 53.

FIG. 55 is a bottom view of the lure of FIG. 53.

FIG. 56 is a side view of another stamp-mounting fishing lure of the invention.

FIG. 57 is a top view of the lure of FIG. 56.

FIG. 58 is a bottom view of the lure of FIG. 56.

FIG. 59 is a side view of another stamp-mounting fishing lure of the invention.

FIG. 60 is a front view of the lure of FIG. 59.

FIG. 61 is a bottom view of the lure of FIG. 59.

FIG. 62 is a top view of another stamp-mounting fishing lure of the invention.

FIG. 63 is a bottom view of the lure of FIG. 62.

FIG. 64 is a side view of another stamp-mounting fishing lure of the invention.

FIG. 65 is a bottom view of the lure of FIG. 64.

FIG. 66 is a side view of another stamp-mounting fishing lure of the invention.

FIG. 67 is a perspective view of another embodiment of the invention, a stamp/web-mounting fishing lure.

FIG. 68 is a perspective view of a stamp/web-mounting plug lure of the invention.

FIG. 69 is a front view of the fishing plug of FIG. 68.

FIG. 70 is a side view of another stamp/web-mounting fishing plug of the invention.

FIG. 71 is a perspective view of another stamp/web-mounting fishing lure of the invention, which has a hollow, generally cylindrical web body.

FIG. 72 is a front view of the lure of FIG. 71.

FIG. 73 is a perspective view of a stamp/picture/photograph-mounting fishing lure of the invention.

DESCRIPTION OF THE PREFERRED EMBODIMENTS

Figure 21:
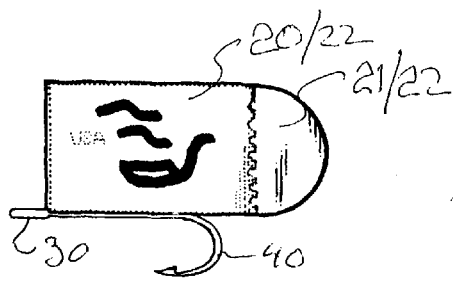
FIG. 21 is a side view of another stamp-mounting fishing lure of the invention.
Figure 22:
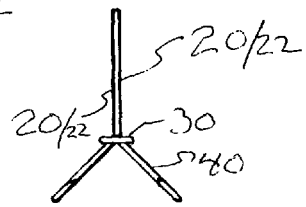
FIG. 22 is a front view of the lure of FIG. 21.
Figure 23:
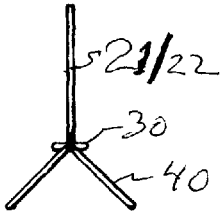
FIG. 23 is a rear view of the lure of FIG. 21.
Figure 24:
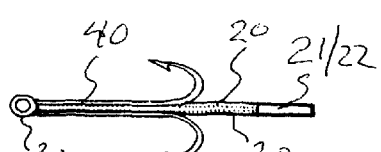
FIG. 24 is a top view of the lure of FIG. 21.
Figure 25:
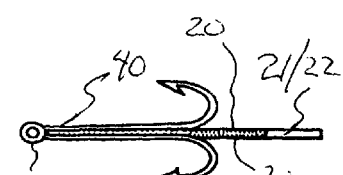
FIG. 25 is a bottom view of the lure of FIG. 21.
Figure 26:
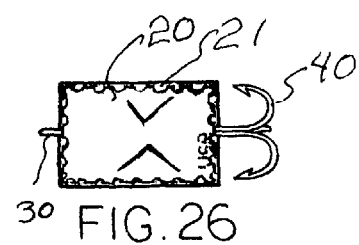
FIG. 26 is a side view of another stamp-mounting fishing lure of the invention.
Figure 27:
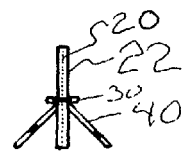
FIG. 27 is a front view of the lure of FIG. 26.
Figure 28:
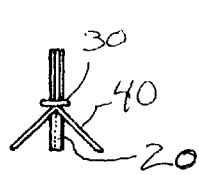
FIG. 28 is a rear view of the lure of FIG. 26.
Figure 29:
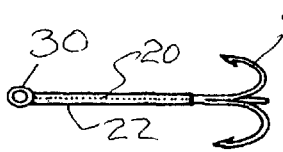
FIG. 29 is a top view of the lure of FIG. 26.
Figure 30:
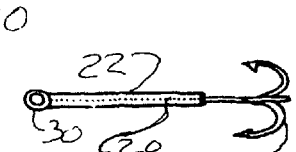
FIG. 30 is a bottom view of the lure of FIG. 26.
Figure 31:
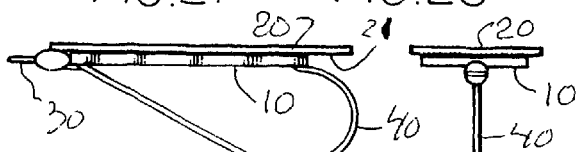
FIG. 31 is a side view of another stamp-mounting fishing lure of the invention.
Figure 32:
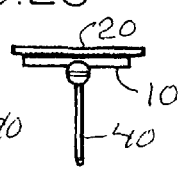
FIG. 32 is a front view of the lure of FIG. 31.
Figure 33:
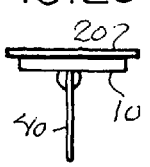
FIG. 33 is a rear view of the lure of FIG. 31.
Figure 34:
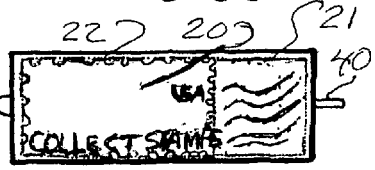
FIG. 34 is a top view of the lure of FIG. 31.
Figure 35:
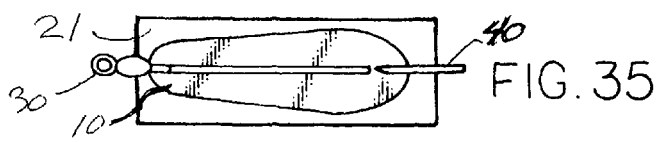
FIG. 35 is a bottom view of the lure of FIG. 31.

The invention is further illustrated by the following detail, which is well taken in view of the accompanying drawings, and which is not necessarily to be construed as limiting in nature:

"Stamp" refers herein to a small piece of paper, or other material employed for the purpose, imprinted on the face with a distinctive design or picture, and usually gummed, or having other adhesive, on the back, issued by a government, or agency of the government, for a specified price and otherwise required to be affixed to an envelope, a letter, parcel, document, commodity subject to a duty, etc., as evidence that the prescribed fee, as an example for carrying mail, has been paid—or any more or less similar piece of paper, issued by an organization, business firm, etc., as a trading stamp. U.S. postal issues are preferred, and these in general may include definitive, commemorative, and special issues, as from panes or sheets, booklets, and coils, as well as non-gummed, gummed, and peel-and-stick adhesive issues.

"Web" herein refers to a small, thin piece of paper or other material imprinted or marked with a graphic design, particularly a photograph or picture. Accordingly, a stamp is a type of web, and the stamp is a preferred, advantageous web.

Although in general any stamp may be employed as a graphic web, including trading stamps, again, U.S. postal issues are preferred for the stamp, especially ones with original printing depicting fishing themes, fishing flies, fish, other creatures, etc. Transportation series stamps or ones with flags, bright colors and/or popular themes are also desirable.

Generally also, any photograph may be employed as a graphic web, to include of persons, animals and/or places. Nevertheless, small portrait photographs of individuals or groups of individuals are preferred for the photograph.

Generally also, any other artistic picture print or design may be employed as a graphic web. Artistic renderings done by children and cartoons or caricatures may be often well received.

The stamp-mounting fishing tackle comprises a stamp featured in combination with fishing tackle, for instance, a postage stamp featured in combination with a fish hook, and optionally with other tackle. The fishing lure hereof may take any of a number of forms, for example, featuring a flat postage stamp or a set of flat stamps attached to a hook as depicted in FIGS. 1-30, to include as embodied with the stamp as or in a flat posture item, to which is attached a body through which a fishing hook is positioned, as depicted in FIGS. 11-15; a flat or even a curved postage stamp attached to a spoon lure, which may contain a simple hook or a weedless hook, etc., as depicted in FIGS. 31-35; a postage stamp curved about and mounted on a rounded lure body with a hook as depicted in FIGS. 36-45, 62 & 63; a postage stamp curved about and mounted on a generally cylindrical lure body with a hook as depicted in FIG. 46; a postage stamp curved about and mounted on a conical-type lure body such as a truncated-conical, or rounded-counical lure body with a hook as depicted in FIGS. 47-52, 64 & 65; a postage stamp curved about and mounted on a semi-cylindrical lure body with a hook as depicted in FIGS. 53-58; a postage stamp curved about and mounted on a hexagonal lure body with a hook as depicted in FIGS. 59-61; a flat stamp or plurality of flat stamps hanging as a spinner or in a plurality of spinners with a loose, dangling hook as depicted in FIG. 66.

The following key is helpful with respect to drawings hereof:

NUMBER FEATURE

10 Body of lure, spoon, bobber; frame of net.
11 Body core.
12 Outer body portion.
20 Web/stamp.
21 Web backing, e.g., paper, cloth, and/or foil, etc.
22 Water-proof coating or lamination.
30 Eye or loop for attaching to other item of tackle, e.g., line, clip, hook, spoon, lure, etc.
40 Hook.
50 Lure head.

51 Mimic eyeballs.

60 Trailing part, e.g., hair, feather, more rigid post, etc.

In general, to make the tackle and lures, etc., of the invention, the stamp or web portion is simply attached to fishing tackle, including that which is intended to attract fish, to include hooks and spoons, and/or any lure body preferably containing the hook such as a cork or foam popper body, a cork, sponge, wood, plastic or other type tackle body, or a metal or painted metal jig body, or even a bobber or net, etc., such as by gluing, taping, heat/melt sealing, imbedding in plastic such as a clear thermoset or reactive molding plastic, by sewing, pinning, wrapping, insertion into a premade slot to accommodate the stamp as a premade envelope to be integral with or attached to a lure body, into a see-through pocket as sheets of glass or of a plastic for exhibit with or without waterproofing lamination or other treatment, into the space between a double-shafted hook which may be barbed, etc., onto a spoon, laminated with plastic and a hole punched therein to form a spoon, laminated and having a hook attached or hook-containing lure body, within a hollow, see-through bobber or pasted on the outside of a lure or bobber body, within a hollow lure body or a hollow casting plug with or without hooks, and so forth and the like, each done alone or combined with other methods. The web or stamp may be laminated with a see-through plastic, and the border of the lamination may extend beyond the edge of the web or stamp and any backing to the stamp, which stamp backing may extend beyond the edge of the stamp border. The stamp backing may be of paper, cloth, reflective tape, wood, plastic, etc., and patterns may be drawn on the back of a stamp or other web or web backing, or may be painted or affixed thereon as by taping of elongate sections of red or orange tape, as by gluing on mimic eyes, sequins, etc., especially on a side opposite a stamp or photograph. Another stamp may back the first stamp wholly or in part as well as is the case with photographs. A canceled postage stamp may be employed, and the material, e.g., paper, upon which it had been affixed may remain with the stamp and be used as a backing. Postal frankings from metered mail may be used as a web, on the Frankel matter. The web, stamp, photograph, etc., and/or any associated lure or other tackle body or hook or spoon part thereof may be dipped in a water-proof coating such as polyurethane, vinyl jig paint whether clear or colored, and so forth and the like. The stamp can often retain any scallop edges it may have. Canceled postage stamps are a good source for the stamps which may be employed herein. A hook can have single or multiple barb(s) including with double or treble hooks. Hooks may be firmly secured to the web or stamp, or lure body, which may be firmly attached to the stamp or other web, or hooks may dangle loosely as may be desired.

The lure may have a body of or containing an embedded graphic web and/or generally curviplanar web or surface such as with, for illustrative purposes, a graphic web of a stamp such as a postage stamp, trading stamp, etc., or a photograph, etc., or a picture, print, artistic design, etc. A generally curviplanar web may be made of metal as well, for an example, taking the shape of a hollow cylinder. In the case of the web being generally curviplanar, it can be curved, for example, into an elliptical, semicylindrical or cylindrical shape.

In one embodiment, the lure embraces a graphic web such as the photograph or artistic picture in combination with a fishing hook. Parallel to the stamp mounting fishing lure embodiments, even a flat photograph or artistic picture attached to a hook can make up the lure. Preferably, the web is waterproofed.

In a further embodiment, the lure is a plug having a plug body, advantageously partially if not fully light-transmissive, in which is embedded a graphic web, for example, the stamp or photograph, which may be provided in the curviplanar, i.e., curved shape. Hook(s) may be attached to or partially embedded in the plug.

In another embodiment, the lure takes the form of a hollow, generally cylindrical surface, for example, the web being a graphic web as of the stamp or photograph formed into a hollow cylinder with a graphic surface of the web on the outside thereof. As an alternative, the hollow surface may include or be provided by metal, for example, a copper sheet, plated copper, brass, plated brass, nickel, stainless steel sheet, etc. To the hollow, generally cylindrical surface, hook(s) is (are) attached.

In such lures, other feature(s) to include the head, mimic eyeballs and/or trailing hair or feathers, etc., may be present.

In general, such lures may be made by standard methods.

In further reference to the drawings, and in particular FIG. 67, lure has photograph 20 attached to fishing hook 40 by gluing.

In particular reference to FIGS. 68 & 69, fishing plug has transparent body 10 made of cast plastic and postage stamp 20 embedded in the body as a first web. A photograph, etc., may be substituted for the stamp 20. Especially in larger, longer plugs, for instance, more than one stamp, photograph, etc., or combination thereof, may be employed as the web. A graphic first web is preferred. Optional inner body core 11 may support the stamp 20 for ease of manufacture, about which outer body portion 12 resides. If an inner stamp-supporting core is employed, core 11 and portion 12 may have the same index of refraction, be of the same material or color, or be different. The core may be opaque. Optional web backing 21 such as another stamp, paper, reflective tape, foil, sheet metal, etc., which may be colored and may have painted or printed designs, especially on the underside, may back up and extend beyond the edges of the stamp. Advantageously, the web backing can be provided, at least in part or as one of several layers of web backing which may be employed for the backing 21, from the material onto which a postage stamp has been affixed for mailing. A design may be put on an unbacked stamp back. The stamp and/or web backing front may have cancellation marks, when posted, or other design. Eyes 30 embedded in or screwed into the body may hold hooks 40.

In particular reference to FIG. 70, fishing plug has lightly colored, e.g., red, orange, yellow, green, etc., transparent cast plastic body in which is embedded postage stamp 20 horseshoeing embedded shaft of hook 40. Optional head 50 with mimic eyeballs 51 and/or trailer 60 may be colored. The plug can be made by casting it in a mold, e.g., with standard casting plastic or the like. Color may be added by colorant(s). Flakes, sequins, etc., may be added to the liquid plastic mix if desired. Any head piece may be embedded fully or partially in the plug body or part thereof, or may be attached after curing as of a cast or thermoset plastic, e.g., as by gluing, tying, etc. Alternatively, a head may be made by wrapping with an upper hook shaft and/or forward plug body part with thread and/or fishing line, etc. Any trailer(s) such as rubber strand(s), hair(s) and/or feather(s) may be embedded fully, or partially, e.g., to trail from the rear of the plug optionally when proximate or originating from a hook or rear eye, if desired. Advantageously, the plastic plug body is light-transmissive when it hardens. Preferably, the plug body is solid, not hollow, although some small air bubbles may be present within an essentially solid plug body. Stamp(s) can be embedded, with or without a support and/or backing, while the plastic is yet liquid. Mimic eyeballs, other feature(s) or hooks may be embedded in or be attached to the plug body after hardening of the plastic plug by drilling holes, and insertion of the hardware or hook(s)

with gluing, and/or screwing of the hardware, etc., with or without pre-drilling. Mimic eyeballs and/or other features may be attached to the head also.

In particular reference to FIGS. 71 & 72, hollow, generally cylindrical lure has postage stamp 20 as the web generally in the shape of a cylinder encircled about and attached to shaft of hook 40. Optional stamp web backing 21 such as paper, reflective tape, foil, sheet metal, etc., which may be colored and may have painted or printed designs, especially on the underside, may back up and extend beyond the edges of the stamp. Advantageously, this web backing is provided from the paper onto which a postage stamp has been affixed for mailing. Optional feature(s) such as, for example, a trailing feather 60 may be present. The hollow lure can be made by forming the web into a cylinder, for example, with a stamp, photograph or print, as by forming a paper sheet into a cylinder and gluing it in place, and then gluing a hook thereto. If the hollow, generally cylindrical body is made of metal, welding, brazing or soldering may replace or augment gluing. Following that, the lure, especially when its web is of or contains a paper-based material as is typically the case with postage stamps and photographs, can be dipped into a waterproof coating material such as a polyurethane coating material and/or a vinyl coating material as can be found, for example, with clear vinyl jig paint. Added color may be provided by colorant(s) and/or by colored coating layers. Preferably, any lure-waterproofing coating is transparent or translucent. Flakes and/or sequins, etc., may be added to a liquid coating mix if desired. An optional head piece may be attached during manufacture such as after attachment of the body to the hook, e.g., as by gluing, etc. Alternatively, a head may be made by wrapping with an exposed portion of an upper hook shaft with thread and/or fishing line, etc. Mimic eyeballs and/or other features may be attached to the head also. Any trailer(s) such as rubber strand(s), hair(s) and/or feather(s) may be attached as by gluing, etc., so as to trail from the rear of the hollow lure.

As depicted in FIG. 73, where a lure is exemplified, the tackle may be provided by insertion into a premade slot 13 to accommodate the stamp as a premade envelope 23 to be integral with or attached to the tackle body or frame. The body or frame with its clip to provide the slot may be molded in one piece. If a lure, the body may include a rubbery or resilient material.

Figure 74:
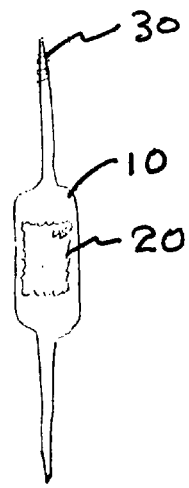
FIG. 74 is a front view of a stamp/picture/photograph-mounting fishing bobber of the invention.
Figure 75:
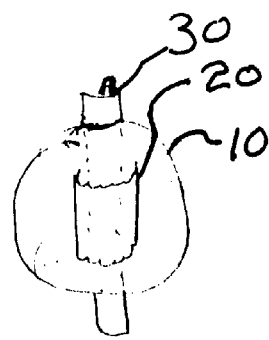
FIG. 75 is a perspective view of another stamp/picture/photograph-mounting fishing bobber of the invention.
Figure 76:
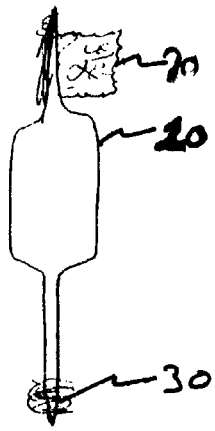
FIG. 76 is a side view of another stamp/picture/photograph-mounting fishing bobber of the invention.

Depicted in FIGS. 74-76 are web or stamp-mounting fishing bobbers. For example, the bobber of FIG. 74 has a postage stamp 20 glued to the outside of its barrel body 10. The bobber of FIG. 75 has web 20 of a stamp or photograph mounted inside a clear or colored but see-through hollow bobber body 10. The bobber of FIG. 76 has a stamp 20 mounted as a flag thereon. The same may have a water-proof coating 22 over the stamp or other web. Of course, a fishing line may be attached about feature 30.

Figure 77:
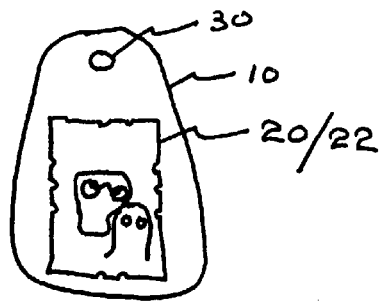
FIG. 77 is a side view of a stamp/picture/photograph-mounting fishing spoon of the invention.

Depicted in FIG. 77 is a stamp/picture/photograph-mounting fishing spoon. It has spoon body 10, web 20 of a stamp, picture, or photograph, with water-proof coating 22, and attaching eye 30.

Figure 78:
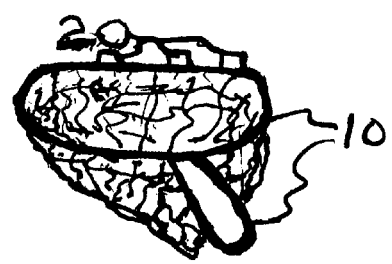
FIG. 78 is a perspective view of a stamp/picture/photograph-mounting fishing net of the invention.
Figure 79:
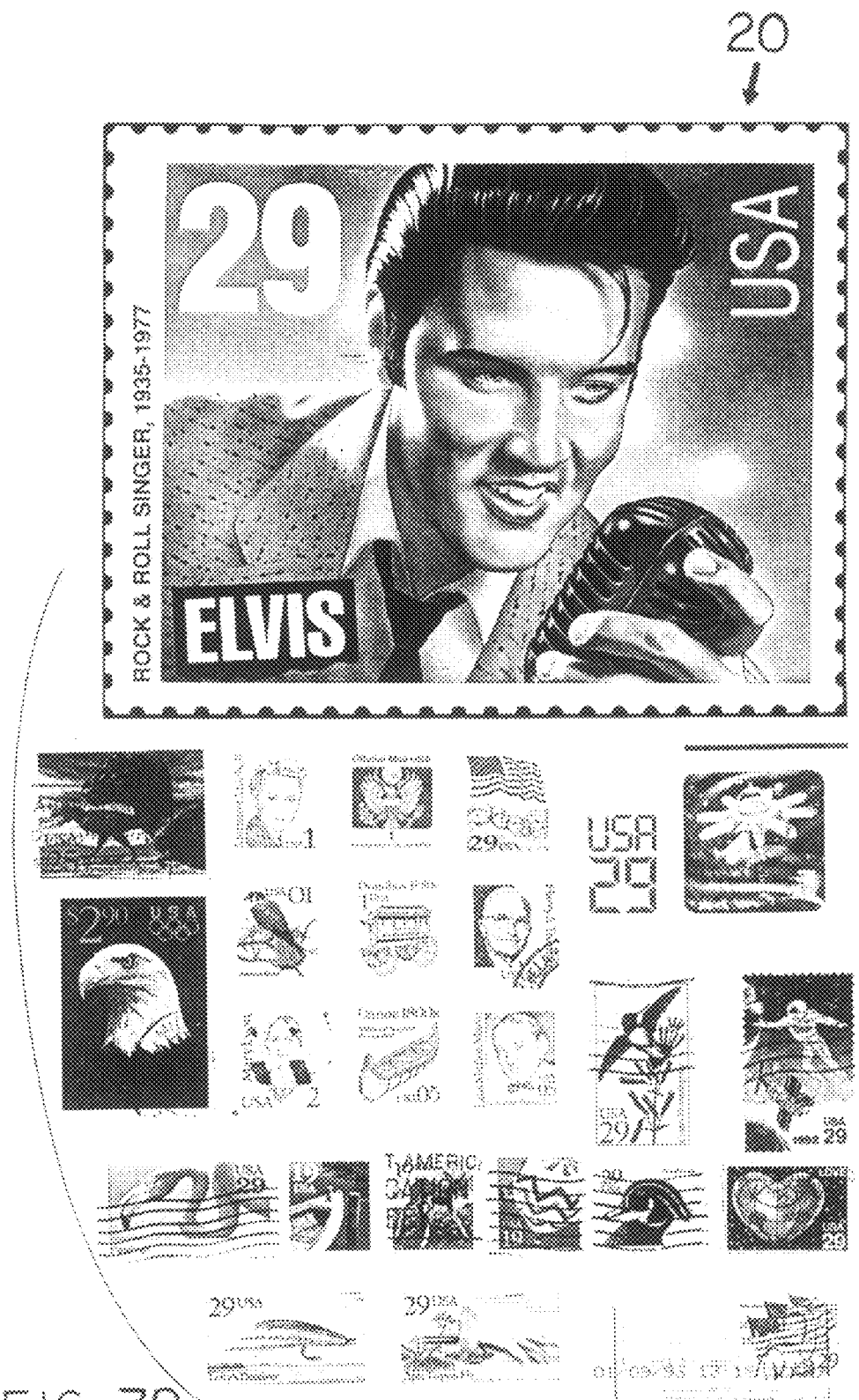
FIG. 79 is a view of a collection of postage stamps, which are some examples of the numerous varieties and styles of stamps that can be employed herein.

Depicted in FIG. 78 is a stamp/picture/photograph-mounting fishing net. It has body 10 including frame, to which is mounted web 20 of stamp, picture, or photograph.

In general, as appropriate, hook(s) may be single, double, treble, be employed alone or in gangs, and be barbed or barbless for fishing. A hook may be of wire, plastic, even glass, be opaque and colored, or clear or colored and light-transmissive, to include as disclosed by Rudy, U.S. Ser. No. 07/180,041 filed Apr. 11, 1988 and abandoned in favor of U.S. Ser. No. 07/425,360 filed Oct. 23, 1989. A bump, flattened or bent portion, etc., may be present on the embedded or glued portion of a hook, e.g., a single-shafted, cylindrically-shaped hook, for example, to help keep it from turning in the plug body or on the hollow lure body. A hook with a square, oval, or other non-cylindrical shaft may be employed with similar effect. Mock hook(s), i.e., blunt-tipped hooks, may be employed as the fishing hook if the lure or plug is intended for display and handling as for during conversation.

In view of the foregoing descriptions and included drawings, in particular with respect to FIGS. 1-77, it can be seen that the web-mounting fishing tackle can comprise a graphic web of a stamp issued by a government or agency thereof, or otherwise a postal franking from metered mail, a trading stamp, or a small portrait photograph of an individual person or group of persons—mounted with a lure, a spinner or spoon, or a bobber. The web may be water-proofed. The lure may be bodied and have a clip to attach the web into about one end of the web; it may be in the form of a fishing plug comprising a plug body in which is embedded the web, with the web water-proofed by the plug body. The plug may have a body in which is embedded a postage stamp made from paper, with the plug body essentially solid and light-transmissive at least to the postage stamp and with the postage stamp water-proofed by the plug body, and have hook(s); it may have the postage stamp embedded in a curved manner with its original printing facing outwardly. The plug may comprise an elongate, essentially solid, light-transmissive plug body through which runs a fishing hook shaft, in the plug body being embedded the postage stamp which is disposed partly around the shaft in a curviplanar, generally semicylindrical, horseshoe like arrangement with the stamp open along a lengthwise plug axis such that the shaft is visible from a position normal thereto, with the shaft terminating on one end outside the plug body with a hook eye, and on another end outside the plug body with a hook bend and tip, and such a plug may have the postage stamp with its original printing facing outwardly, a stamp backing to make a stamp plus backing assembly, and the backing reflective with respect to the underside of the assembly. Further, a stamp-mounting fishing lure especially can comprise a postage stamp made from paper mounted with at least one fishing hook to form the lure, with the lure waterproofed. Such a lure can have the stamp as or in a flat posture item, with at least one fishing hook attached to the item, and the stamp can have a stamp backing to make a flat posture stamp plus backing assembly item. Such a lure can have a lure body, with the stamp as or in a generally curved posture item, and attached to a lure body and generally cantilevered therefrom, and with at least one fishing hook mounted in the lure body by a shaft of the hook, with the hook shaft terminating on one end outside the lure body with a hook eye, and on another end thereof outside the lure body with a hook bend and tip, with at least part of the hook shaft that terminates with the hook bend and tip positioned outside the lure body and underneath a part of the stamp item so cantilevered from the lure body; it may float or sink in water, and the stamp may have a stamp backing to make a generally curviplanar posture stamp plus backing assembly item. It may be decorated with paint, tape, foil, a head, mimic eyeballs, or a trailing part. The lure can be an open ended one, with a hollow, generally cylindrical body with the postage stamp, with the body attached to the fishing hook. The stamp can be non-halographic.

The lure of the invention may be admired, kept as a conversation piece, and/or fished similar to other fishing lures, with or without added natural or artificial bait. Surprisingly, many lure arrangements hereof can themselves mimic live bait.

Herein, "non-halographic," means "non-holographic."

The present invention is thus provided. Numerous adaptations and modifications can be effected within its spirit, the literal claim scope of which is particularly pointed out as follows:

I claim:

1. Web-mounting fishing tackle, which comprises, in combination:
   a graphic web, which web is selected from the group consisting of a stamp issued by a government or agency thereof, and otherwise a postal franking from metered mail; a trading stamp; and a photograph, which is a small portrait of an individual person or group of persons; and
   an item of fishing tackle selected from the group consisting of a lure; a spinner or spoon; and a bobber;
   wherein said graphic web is mounted with said item of fishing tackle, and wherein said graphic web is water-proofed, and said item of fishing tackle is selected from the group consisting of the following members:
   the lure, which has at least one hook, and which is selected from the group
      consisting of the following members:
         a first lure, which is embodied with the graphic web being non-holographic and as or in a flat posture item, wherein the at least one hook is(are) fishing hook(s) attached to the flat posture item;
         a second lure, which is a bodied lure having a clip to hold said graphic web therein, with said graphic web attached to the clip about one end of said graphic web;
         a third lure, which is a fishing plug comprising a plug body, into which is embedded said graphic web, and wherein said graphic web is water-proofed by the plug body; and
         a fourth lure, wherein the at least one hook is(are) mock hook(s) such that the lure can be handled, be displayed, and be a conversation piece;
      the spinner or spoon, wherein said graphic web is a postage stamp of or containing a paper-based material, and is non-holographic; and
      the bobber.

2. The tackle of claim 1, wherein said item, of fishing tackle is the first lure.

3. The tackle of claim 1, wherein said item of fishing tackle is the spinner or spoon.

4. The tackle of claim 1, wherein said item of fishing tackle is the second lure.

5. The tackle of claim 1, wherein said item of fishing tackle is the third lure.

6. The tackle of claim 1, wherein said item of fishing tackle is the fourth lure.

7. A fishing plug comprising, in combination:
   a plug body; and
   a non-holographic postage stamp of or containing a paper-based material;
   wherein the postage stamp is embedded in the plug body; the plug body is essentially solid and light-transmissive at least to the postage stamp; the postage stamp is water-proofed by the plug body; and at least one hook is part of the plug.

8. The plug of claim 7, wherein the postage stamp is embedded in a curved manner with original printing facing outwardly.

9. The plug of claim 7, wherein the plug comprises an elongate, essentially solid, light-transmissive plug body through which runs a fishing hook shaft, in the plug body being embedded the postage stamp which is disposed partly around the shaft in a curviplanar, generally semicylindrical arrangement with the stamp open along a lengthwise axis of the plug such that the shaft is visible from a position normal thereto, and wherein the fishing hook shaft terminates on one end thereof outside the plug body with a hook eye, and on another end thereof outside the plug body with a hook bend and tip.

10. The plug of claim 9, wherein the postage stamp has original printing thereon facing outwardly, and has stamp backing to make a stamp plus backing assembly, and the backing is reflective with respect to the underside of said assembly.

11. A stamp-mounting fishing lure, which comprises, in combination:
   a non-holographic postage stamp of or containing a paper-based material; and
   at least one fishing hook to form the lure;
   wherein the lure is water-proofed.

12. The lure of claim 11, which is embodied with the stamp as or in a flat posture item, with at least one fishing hook attached to the flat posture item.

13. The lure of claim 12, wherein the stamp has a stamp backing to make a flat posture stamp plus backing assembly item.

14. The lure of claim 11, which further comprises a lure body, with the stamp as or in a generally curved posture item, and attached to the lure body and generally cantilevered therefrom, and with at least one fishing hook mounted in the lure body by a shaft of the hook, wherein the hook shaft terminates on one and thereof outside the lure body with a hook eye, and on another and thereof outside the lure body with a hook bond and tip, and wherein at least part of the hook shaft terminating with the hook bend and tip is positioned outside the lure body and underneath a part of the stamp in the generally curviplanar posture item so cantilevered from the lure body.

15. The lure of claim 14, wherein the stamp has a stamp backing to make a generally curviplanar posture stamp plus backing assembly item.

16. The lure of claim 15, which is decorated with a material selected from the group consisting of paint, tape, foil, a head, mimic eyeballs, and a trailing part.

17. The lure of claim 11, which further comprises a hollow, generally cylindrical lure body, which contains the postage stamp, forms an open ended lure, and is attached to the fishing hook.

18. The lure of claim 11, which further comprises a body, wherein the stamp is present as or in a flat posture item, to which item is attached the body, through which body one and only one fishing hook is positioned.

19. The tackle of claim 1, wherein said graphic web is said photograph, and said item of fishing tackle is the lure.

20. The tackle of claim 5, wherein said graphic web is said photograph.

21. The tackle of claim 1, wherein said item of fishing tackle is the bobber.

* * * * *